Figure 1:
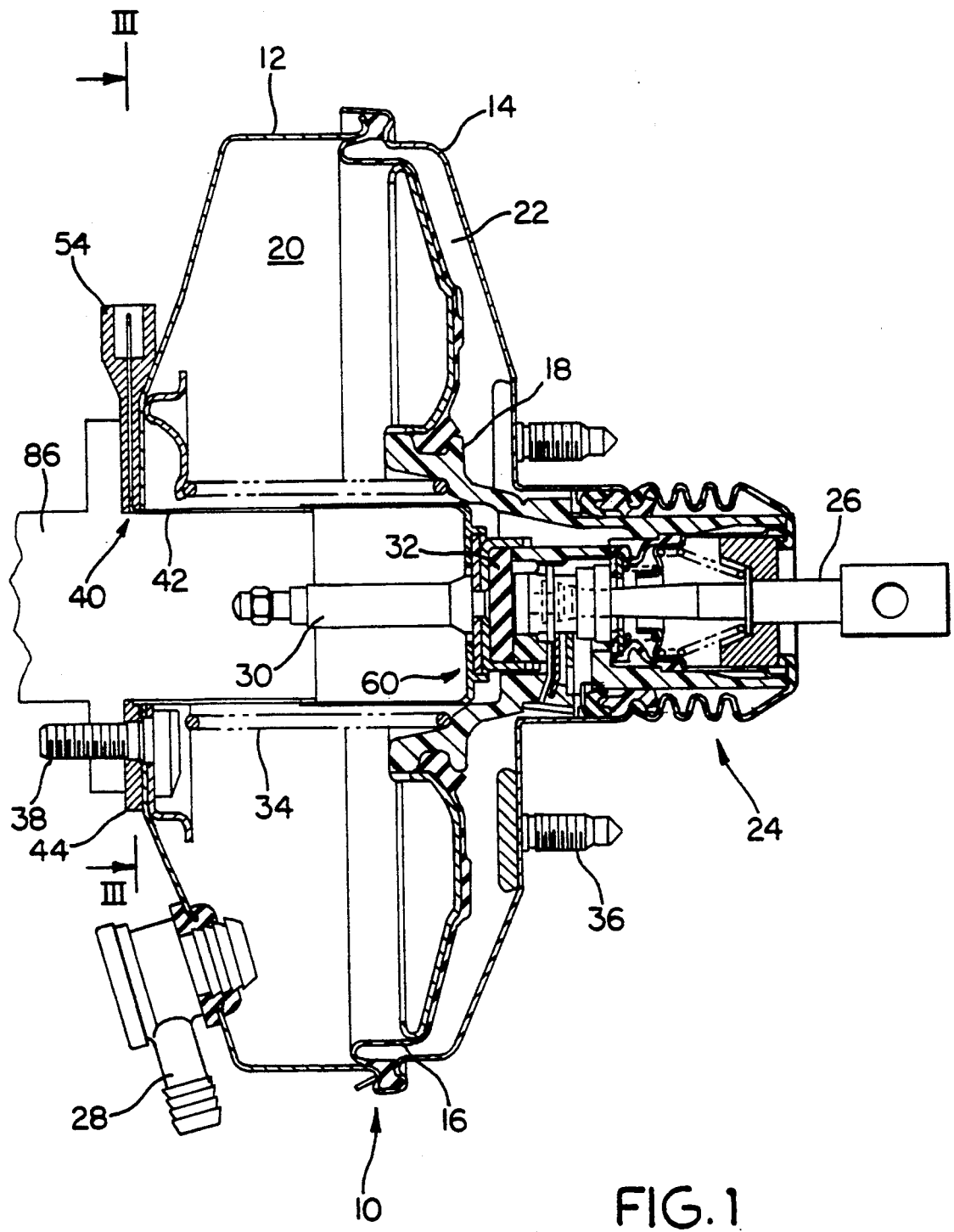

United States Patent [19]
Gautier et al.

[11] Patent Number: 5,226,312
[45] Date of Patent: Jul. 13, 1993

[54] DEVICE FOR MEASURING THE POSITION OF A PUSH ROD OF A PNEUMATIC BOOSTER

[75] Inventors: Jean-Pierre Gautier, Aulnay-sous-Bois; Miguel Perez, Argenteuil; Ulysse Verbo, Aulnay-sous-Bois, all of France

[73] Assignee: Bendix Europe Services Techniques, Drancy, France

[21] Appl. No.: 808,319

[22] Filed: Dec. 13, 1991

[30] Foreign Application Priority Data

Dec. 20, 1990 [FR] France ............................ 90 16026

[51] Int. Cl.⁵ .......................................... G01M 19/00
[52] U.S. Cl. .................................... 73/129; 188/1.11
[58] Field of Search .............. 73/118.1, 129; 340/453, 340/454; 188/1.11, 356

[56] References Cited

U.S. PATENT DOCUMENTS

| | | | |
|---|---|---|---|
| 3,997,887 | 12/1976 | Poynter | 340/453 X |
| 4,091,902 | 5/1978 | Hamada | 192/0.076 |
| 4,664,239 | 5/1987 | Symes et al. | 192/0.084 |
| 4,978,820 | 12/1990 | Levrai et al. | 200/82 D |

FOREIGN PATENT DOCUMENTS

| | | |
|---|---|---|
| 345459 | 12/1989 | European Pat. Off. . |
| 0353117 | 1/1990 | European Pat. Off. . |
| 8813834 | 2/1989 | Fed. Rep. of Germany . |
| 2102906 | 2/1983 | United Kingdom . |
| 2108678 | 5/1983 | United Kingdom . |

*Primary Examiner*—Jerry W. Myracle
*Attorney, Agent, or Firm*—Larry J. Palguta; Ken C. Decker

[57] ABSTRACT

The invention relates to a device for measuring the position of a push rod (30) of a pneumatic booster consisting of a housing (10) divided into a front chamber (20) and a rear chamber (22) by way of a moveable wall (18) returned to its rest position by a restoring spring (34), the booster actuating a piston (84) of a master cylinder (86) by means of the push rod (30), the measuring device comprising a first part (40) stationary relative to the housing (10) of the booster and a moveable second part (60), the first part (40) and second part (60) carrying electrical contacts (46, 46', 48, 48', 84; 76, 78).

According to the invention, the first part (40) and second part (60) are cylindrical and coaxial, and they are arranged round the push rod.

12 Claims, 4 Drawing Sheets

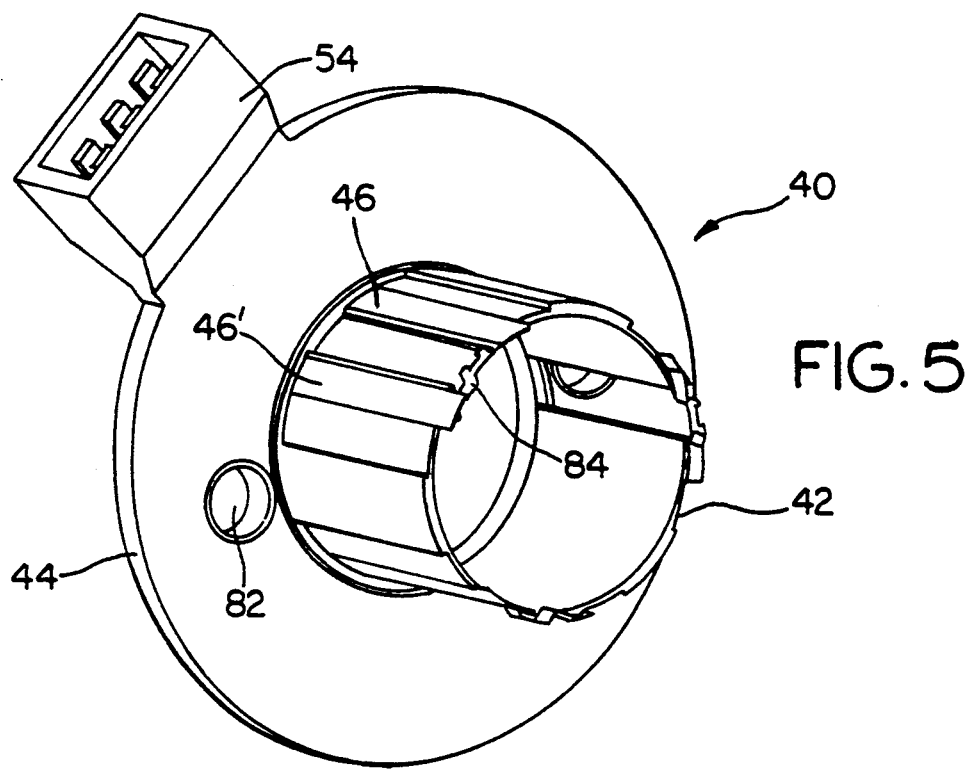
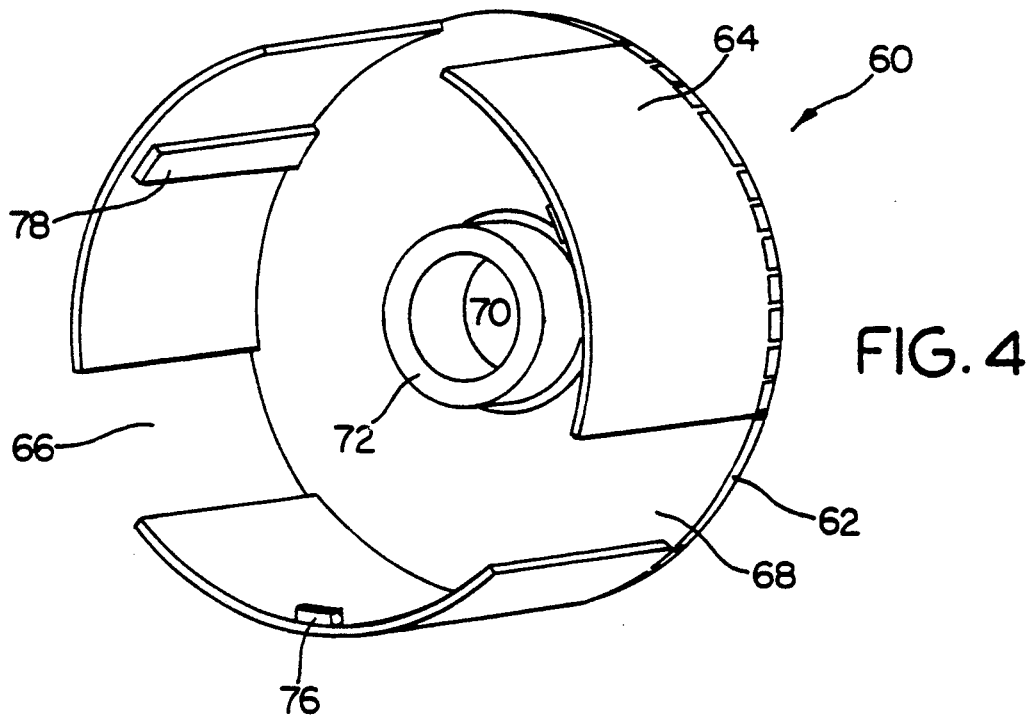

DEVICE FOR MEASURING THE POSITION OF A PUSH ROD OF A PNEUMATIC BOOSTER

The subject of the present invention is a device for measuring the position of a push rod of a pneumatic booster, for example for controlling a brake circuit or a clutch system.

In the motor-vehicle industry, it has become customary to assist various controls actuated by the vehicle driver, such as the braking, clutch disengagement or suchlike controls, by means of various force-amplifying devices which require only a limited force from the driver for the same output force.

Such force-amplifying devices currently consist of pneumatic boosters comprising a housing divided into a front chamber and a rear chamber by means of a moveable wall displaceable from a rest position adjacent to the rear wall of the housing. These boosters function to entire satisfaction.

However, for reasons of safety and/or efficient operation, it is desirable to know the state of these force-amplifying devices at any moment, in order to activate an alarm signal in the event of a failure, for the purpose of controlling other devices or influencing a feedback loop.

The document FR-A-2,509,883 makes known a clutch-relief booster comprising a recorder for measuring the position of the stroke of the booster, consisting of a conductive strip extending in the direction of this stroke and of a pick-up carried by the moveable rod of the booster, the conductive strip and the pick-up together forming a linear potentiometer supplying a measurement signal for controlling the operation of the booster.

In this document, the measuring recorder is integrated in the housing of the booster, thus making it necessary for this to be of special and relatively complex design, preventing it from being used on boosters of conventional design.

To overcome this disadvantage, an object of the invention is to provide a device for measuring the position of the push rod of a pneumatically actuated booster which can be fitted on booster housings of conventional type, without any modification of these and without any increase of their overall size.

To achieve this, the invention provides a device for measuring the position of a push rod of a pneumatic booster consisting of a housing divided into a front chamber and a rear chamber by means of a moveable wall returned to its rest position by a restoring spring, the booster actuating a master cylinder by means of a push rod, the measuring device comprising a first part stationary relative to the housing of the booster and a moveable second part, the first and second parts carrying electrical contacts.

According to the invention, the first and second parts are cylindrical and coaxial and they are arranged round the push rod.

Figure 3:
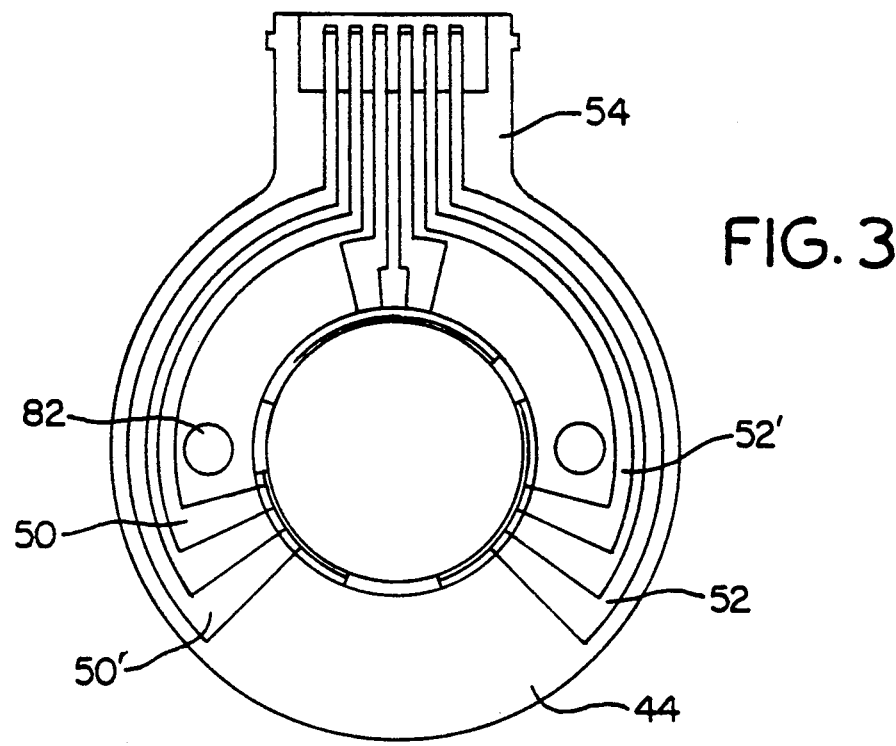
Figure 2:
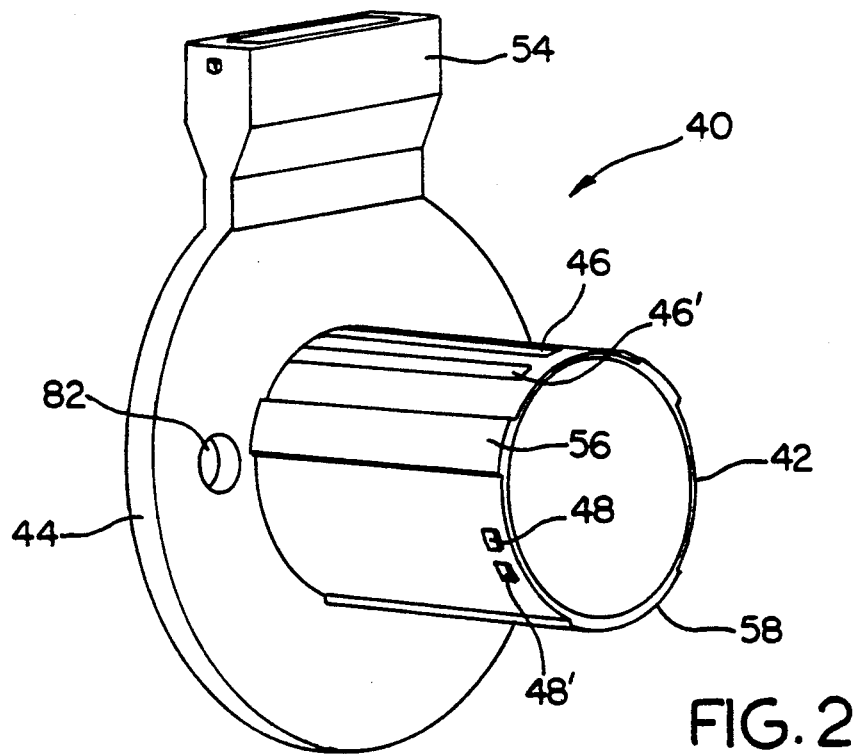
Figure 6:
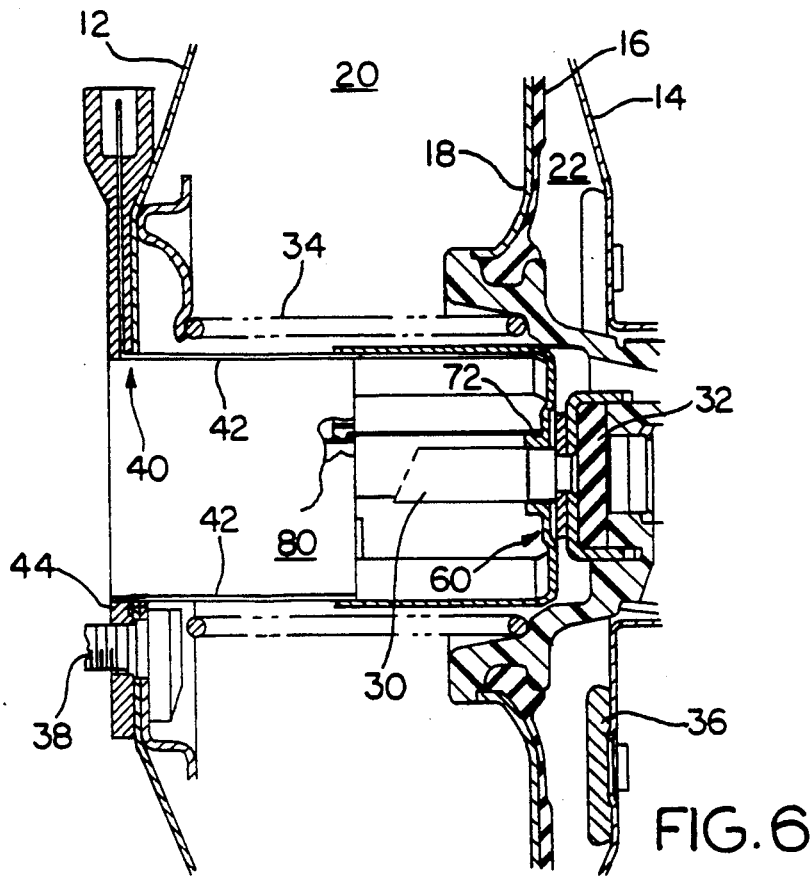
Figure 7:
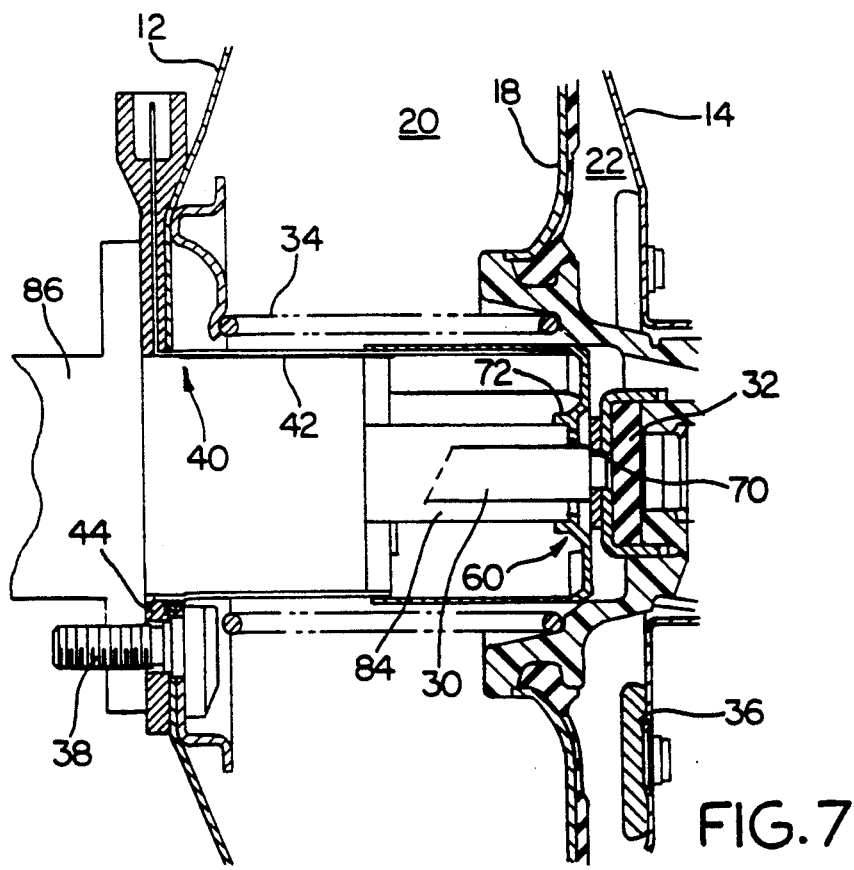

The invention will now be described by way of example with reference to the accompanying drawings in which:

FIG. 1 shows in section a pneumatic booster comprising a measuring device according to the present invention, FIG. 2 shows in perspective the stationary first part of a first embodiment of a measuring device according to the present invention, FIG. 3 shows the stationary first part of the measuring device in section along the line III—III of FIG. 1, FIG. 4 shows the moveable second part in perspective, FIG. 5 shows in perspective the stationary first part of a second embodiment of the measuring device according to the present invention, FIG. 6 shows in partial section a pneumatic booster comprising a measuring device according to a first alternative version of the invention, and FIG. 7 shows in partial section a pneumatic booster comprising a measuring device according to a second alternative version of the invention.

FIG. 1 illustrates a pneumatic booster, for example for braking assistance, incorporating a measuring device produced according to the present invention. By convention, the direction in which the moveable components move when they are actuated will be called the "front" and the direction in which they return to resume their rest positions the "rear". Thus, in the figures, the front is on the left and the rear is on the right.

The booster illustrated in FIG. 1 comprises, in the conventional way, a housing 10 formed from a front shell 12 and from a rear shell 14 which are joined sealingly and which contain an unwinding diaphragm 16 fastened by means of its inner periphery to a moveable piston 18. The diaphragm 16 and the piston 18 divide the housing 10 into a front chamber 20 and a rear chamber 22 which can be selectively isolated or put into communication by valve means 24 during the actuation of the booster by its control rod 26. In a known way, the front chamber 20 and rear chamber 22 communicate when the booster is in its rest position shown and are under a reduced pressure introduced into the front chamber 20 via the connector 28, and they are isolated during an actuation of the booster, air at atmospheric pressure then being introduced into the rear chamber 22 by means of the valve 24. The difference in the pressures prevailing on each side of the piston 18 causes the latter to advance, driving in its movement a push rod 30 by the agency of a reaction disk 32. The push rod 30 then itself actuates the piston of a master cylinder of a brake circuit or a clutch transmitter, these not being shown. After being actuated, the booster returns to its rest position shown under the action of the restoring spring 34 arranged between the front shell 12 and the piston 18. In a way likewise known the booster is fastened to a stationary part of the vehicle, for example the apron, by means of bolts 36 on its rear part, and it is connected to the master cylinder or to the clutch transmitter by means of bolts 38 on its front part.

According to the present invention, a device for measuring the position of the push rod of the booster has been provided on this booster. Such a device can serve, for example, for closing a contact and thereby illuminating brake warning lights ("stop" lights) or putting a wheel anti-lock circuit in the standby position or, on the contrary, opening a contact and thus deactivating other circuits, such as, for example, speed-regulating circuits. This measuring device consists of two parts. The first part 40 comprises a cylindrical part 42 connected to a disk-shaped part 44.

As can be seen better in FIG. 2, the cylindrical part 42 comprises, on its outer periphery, conductive lamellae 46, 46' extending in the axial direction and conductive studs 48, 48' in the vicinity of its rear end. These lamellae 46, 46' and these studs 48, 48' are electrically connected respectively to conductive tracks 50, 50' and 52, 52' formed on or in the material of the disk-shaped part 44 as can be seen in FIG. 3. These tracks end at terminals formed on an extension 54 of the part 44 which can advantageously be produced in the form of a connector. The cylindrical part 42 likewise comprises, on its outer periphery, splines 56, 58 extending in the axial direction.

The second part 60 of the measuring device is illustrated in FIG. 4 and comprises a circular bottom 62 extended forwards by a cylindrical part 64, in which have been made slots or recesses 66, 68 intended for interacting with the respective splines 56, 58 of the first part, to ensure the guidance of the second part on the first. Advantageously, for example, the splines 58 and the recesses 68 can be produced with a larger width than that of the splines 56 and recesses 66, so as to ensure correct positioning during the mounting of the two parts on one another. The circular bottom 62 possesses, at its center, an orifice 70 surrounded by a collar 72, the use of which will be explained later, the orifice 70 being provided for the passage of the push rod 30 of the booster.

Arranged inside the cylindrical part 64 and in the vicinity of its front end is a conductive stud 76, of which the length in the circumferential direction is greater than the distance separating the lamellae 46, 46' or the studs 48, 48'.

The functioning of the measuring device just described will easily be understood. When the first part 40 and second part 60 are assembled together, the splines 56, 58 penetrate into the respective slots or recesses 66, 68 and allow the axial sliding of the two parts relative to one another, while preventing their relative rotation. There can advantageously be a snapping of the two parts on one another, as illustrated at 80 in FIG. 6, to allow the easy engagement of the second part 60 on the first 40 and, on the contrary, to make their disengagement difficult.

The measuring device thus assembled is installed in a booster, as illustrated in FIG. 1, the disk-shaped part 44 of the stationary first part 40 of the measuring device coming to rest against the front face of the booster, while the moveable second part 60 is brought into position as a result of the forced engagement of the collar 72 onto the push rod 30 of the booster so as to fasten it to this, as shown in FIG. 6. In this position, the front end of the second part 60 is engaged slightly on the rear end of the first part 40. It is then possible to install a master cylinder or a clutch transmitter on the booster so equipped by means of the bolts 38 interacting with orifices made in the mounting flange of the master cylinder 86, orifices 82 advantageously having been made in the disk-shaped part 44 for the passage of the bolts 38 fastening the master cylinder 86 to the housing 10 of the booster. The measuring device is thus held in place without any additional component.

During an actuation of the booster, the movement of the push rod 30 will cause the second part 60 to move in relation to the first part 40. If the stud 76 is intended for interacting with the lamellae 46, 46', it will thus overlap these lamellae in its movement and make electrical contact between them, and this electrical contact will then be made between the corresponding terminals of the connector 54 in order, for example, to cause the illumination of brake warning lights if the booster is connected to a brake master cylinder. In contrast, if the stud 76 is intended for interacting with the studs 48, 48' it will leave these studs in its movement and will break the electrical contact between them, and this circuit break can likewise be detected at the corresponding terminals of the connector 54, for example, put a speed-regulating circuit out of action.

Instead of a stud 76 in the second part 60, a conductive lamella 78 (FIG. 4) can be provided. As before, during the movement of the second part 60 in relation to the first part 40, the lamella 78 will overlap the studs 48, 48' or the lamellae 46, 46' of the first part 40 and thus make electrical contact between the corresponding terminals of the connector 54.

In an advantageous embodiment, the lamellae 46, 46' of the first part 40 can be produced from an electrically resistive material, such as that used in linear potentiometers. Between the corresponding terminals of the connector 54 there will therefore be an electrical quantity, such as, for example, electrical resistance, variable continuously as a function of the relative position of the two parts of the measuring device, and no longer of the all-or-nothing type as in the preceding case. In a likewise advantageous embodiment, the conductive lamella 78 can be covered with a dielectric material, such as a varnish, as can the lamellae 46, 46'. Thus, during the movement of the second part 60 in relation to the first part 40, the lamellae 46, 46' and 78 form the armatures of a capacitor, of which the capacitance, measured at the corresponding terminals of a connector 54, will thus be variable as a function of the relative position of the first and second parts 40 and 60. The varnish deposited on the lamellae performs the simultaneous function in this embodiment of preventing the lamella 78 from returning into contact with the lamellae 46, 46' possibly as a result of the vibrations of the vehicle. There can also be provision for measuring, at the terminals of the connector 54, an inductance variable as a function of the relative position of the first and second parts 40 and 60.

FIG. 5 illustrates a second embodiment of the first part 40 of the measuring device according to the present invention. According to this embodiment, one of the lamellae 46 or 46' described above is formed with a tongue 84 located at its rear end, and, for example, extending perpendicularly relative to the axial direction of the lamella 46 and therefore in a circumferential direction, so as to come to bear as a result of elasticity on the face of the other lamella 46' turned towards the inside of the device.

During an actuation of the booster, if the tongue 84 is intended for interacting with the stud 76, the latter will leave the tongue 84 in its movement and allow to return to bear on the lamella 46', thus making contact between the lamellae 46, 46' and the corresponding terminals of the connector 54. If, on the other hand, the tongue 84 is intended for interacting with the lamella 78, the latter will come to bear on the tongue 84 in its movement, so as to cause it to lose contact with the lamella 46' and thus break contact between these lamellae and therefore between the corresponding terminals of the connector 54.

It will be seen that, in this embodiment, there is no need to produce the lamella 78 and the stud 76 from electrically conductive material, thereby simplifying the production of the second part 60. It will also be seen that, in this embodiment, electrical contact is always made or broken at the same location, that is to say at the point where the tongue 84 bears at rest on the lamella 46'. This is therefore a clear contact, in contrast to the sliding contacts described in respect of the preceding embodiment. The front edge of the lamella 78 or the rear edge of the stud 76 can advantageously be produced with a bevelled profile to make it easier to engage with the tongue 84.

FIG. 7 illustrates an alternative version of the embodiment shown in FIG. 6. It can be seen from this figure that the orifice 70 made in the circular bottom 62 of the second part 60 has a diameter larger than that of the push rod 30, while the column 72 has an inside diameter equal to the outside diameter of the piston 84 of the master cylinder or of the clutch transmitter 86 actuated by the booster.

Once the first part 40 and second part 60 are assembled with one another and snapped together as explained with reference to FIG. 6, the measuring device is installed directly on the rear part 86 of the master cylinder. The collar 72 then comes into place and is fastened round the piston 84, as mentioned above.

Advantageously, the inside diameter of the cylindrical part 42 of the first part 40 can be equal to the outside diameter of the rear part 86 of the master cylinder so that the measuring device remains fastened to the master cylinder. It is then sufficient to introduce the latter so equipped into the booster in the usual way.

What we claim is:

1. Device for measuring the position of a push rod of a pneumatic booster consisting of a housing divided into a front chamber and a rear chamber by means of a moveable wall returned to a rest position by a restoring spring, the booster actuating a piston of a master cylinder by means of the push rod, the measuring device comprising a first part stationary relative to the housing of the booster and a moveable second part, the first part and second part carrying electrical contacts wherein the first part and second part are cylindrical and coaxial and in that they are arranged round the push rod.

2. Device according to claim 1, wherein the electrical contacts are connected to terminals formed on an extension of the first part.

3. Device according to claim 2, wherein the extension of the first part is produced in the form of a connector.

4. Device according to claim 3, wherein, during the actuation of the piston of the master cylinder, the electrical contacts open an electrical circuit between terminals of the connector.

5. Device according to claim 3, wherein, during the actuation of the piston of the master cylinder, the electrical contacts close an electrical circuit between terminals of the connector.

6. Device according to claim 3, wherein, during the actuation of the piston of the master cylinder, the electrical contacts, cause an electrical quantity to vary between terminals of the connector.

7. Device according to claim 1, wherein the device is arranged in the housing of the booster, the second part being fastened to the push rod of the booster.

8. Device according to claim 1 wherein the device is arranged on the master cylinder, the first part being fastened to the master cylinder, and the second part being fastened to the piston of the master cylinder.

9. Device according to claim 1, wherein the device is arranged between the master cylinder and the booster.

10. Device according to claim 9, wherein the device is arranged in the front chamber round a rear part of the master cylinder.

11. Device according to claim 10, wherein the device comprises a disk-shaped part formed on the first part arranged between a front face of the housing and a mounting flange of the master cylinder.

12. Device according to claim 11, wherein the device comprises orifices for the passage of bolts for fastening the master cylinder to the housing of the booster.

* * * * *